United States Patent [19]
Haan

[11] Patent Number: 5,662,446
[45] Date of Patent: Sep. 2, 1997

[54] EASY LOCK SAFETY SPRING COTTER PIN

[76] Inventor: Louis R. Haan, 3747 W. Rte. 64, Mt. Morris, Ill. 61054

[21] Appl. No.: 429,516

[22] Filed: Apr. 26, 1995

[51] Int. Cl.$^6$ ............................ F16B 21/14; F16B 21/18
[52] U.S. Cl. .......................... 411/514; 411/530; 411/940; 411/946
[58] Field of Search ........................ 411/358, 513, 411/514, 515, 530, 940, 946

[56] References Cited

U.S. PATENT DOCUMENTS

| | | | |
|---|---|---|---|
| 2,135,323 | 11/1938 | Brantingson | 411/514 X |
| 2,926,033 | 2/1960 | Zarrillo | 411/530 X |
| 4,205,586 | 6/1980 | MacNeill | 411/530 |
| 4,298,299 | 11/1981 | Quarles | 411/514 |
| 4,592,689 | 6/1986 | Leitzke | 411/530 X |
| 5,217,338 | 6/1993 | Czubek | 411/358 X |

*Primary Examiner*—Neill R. Wilson

[57] ABSTRACT

A twist lock insertion and twist release extraction type spring cotter pin having one primary straight end extremity to be inserted through an aperture in a structural element and its opposite adjacent free end extremity consisting of a series of arcuate curves allowing them to partially rotate or counter rotate about the surface of said structural element. And, commensurate with this, an easy grasp handle all made of spring steel type wire. The method of said designed invention allows for a new definition of utility for a spring cotter pin of this particular unique function the extraordinary characteristics of which demonstrate a locking spring pins basic need for a revision of often ignored operational safety features without compromising the new standards it has attained for ease of function yet maintaining its overall convenience, reliability and durability.

8 Claims, 3 Drawing Sheets

EASY LOCK SAFETY SPRING COTTER PIN

FIELD OF THE INVENTION

This invention is in reference to a new method for ease of insertion and removal of variously designed spring cotter pins used on structural element apertures.

BACKGROUND OF THE INVENTION

This particular concept involves providing a very simple means for insertion and extraction of the spring clip cotter key type formations. Its exclusive twist lock—twist release concept is very basic and easily understood to the extend that it is applicable to universal functions. It provides an easy grasp handle for virtually effortless and safe operation.

All previous attempts to insert and remove cotter pins of the spring clip removable type have required varying degrees and combinations of differing manuvers and skills resulting in confusion and arduous physical effort with soreness or injury to ones hands or fingers.

To avoid confusion with the teaching of any prior art spring cotter pin or locking device of that nature I would care to for example refer to a patent entitle "Twist type Locking Pin" issued Jun. 8, 1993 to inventor Richard S. Czuber, U.S. Pat. No. 5,217,338 which I find necessary to explain. It relates to a completely different proceedure of implementation although a twist and lock feature is claimed. Involved in this teaching is a semicircular extrimity which is twisted or turned independently from the surface of a drilled shaft before it comes to rest in its final position against the surface of the shaft in a semi-circular grip requiring considerable physical and mental effort. Said operation in no way relates to the different method of teaching in my embodiment where a combination of twists involving helical curves gripping and rotating about the surface of a drilled structural element minimizes any effort required to insert or remove a spring cotter pin thus providing a more simple and safe method for its insertion and locking, and its release and removal.

Also, one final distinction must be referred to as found in an early example in a United Kingdom patent #123,461 by Arthur Graham France issued Feb. 27, 1919; and also a later example of a U.S. Pat. No. 2,399,119 by J. S. Howell issued Apr. 23, 1946, whereby the technique required to secure the half loop portion of the referred to spring cotter pin firmly against the surface of a shaft, stud or bolt requires a designated straight forward planar movement the necessary momentum of which is excessively cumbersome with no effective grasping means to accompany such a task.

Such action for insertion to often requires excessive physical effort for gripping the spring cotter pin; and the forward thrust needed to provide the momentum necessary to actuate the usefulness of this invention exposes possible injury to one's hands and fingers. Because this difficulty exists the user has a tendency to try to wiggle and jiggle the spring cotter pin in an effort to work or push its extrimity over the shaft or bolt to its ultimate useful purpose. These excessive repetitive motions have caused soreness and injury especially to one's hands and fingers not to mention putting the rest of the user's body in an awkward position trying to implement this action if the spring cotter pin must be used in a somewhat inaccessible location.

The method I employ differs by involving a series of outward extending lateral helical curves which make use of ones natural tendency to twist or rotate the spring cotter pin like a key knowing the inherent effort needed for application thus providing the much needed additional thrust or pull necessary as provided in a simple form to engage or disengage the spring cotter pin by the proper rotation and counter rotation of the helical curves about the surface of the structural element.

Along with an easy grasp handle I have taken previous difficult and dangerous efforts and converted them to a natural useful and safe method of a simple sequence of partial twists or rotations allowing for a much simplified effort involving a new common insertion and extraction of the spring cotter pin through and about the surface of structural elements.

BRIEF SUMMARY OF THE INVENTION

Involved in the present invention is a twist lock insertion and twist release extraction type spring cotter pin having an easy grasp handle allowing for a very minimal amount of effort required to insert or remove the spring cotter pin in a standardized method allowing for an easy and safe proceedure.

The function of this invention is primarily safety orientated as demonstrated by its method of application. All other types and forms of spring cotter pin inventions relate their usefulness to an understanding of a to often complicated mechanical, mental or physical strategy necessary to apply their underlying claims resulting in what they claim is a safe, reliable and durable invention. What they fail to realize is that it is useless unless it is used and the user feels totally comfortable and safe using it. If the invention is not useful, convenient and "friendly" the user will fail to use it thus creating a safety hazzard.

I have adopted my invention to a user friendly atmosphere. Since many hitch pins or structural elements needing a spring cotter pin type keeper are located in difficult and sometimes hard to find or reach positions it becomes difficult to implement their complicated application strategy. My twist lock—twist release spring cotter pin key relies on a very simple and basic need to apply a simple but effective means of securing a hitch pin or shaft to its intended position by relying on a spring cotter pin that can be inserted and extracted easily with minimal effort in unusually tight or awkward positions with a physical and mental effort quite similar to locking a door with a key with no fear of strain or injury to ones hands or fingers. Coupling and uncoupling two independent elements in today's industry (especially farming) has proven to be a very hazardous risk in which using a spring cotter pin locking device is to often neglected totally because of the unusual or difficult workmanship needed to effectively discipline oneself to use it. It is the sort of task that one cares to do in a hurried manner or totally eliminate for difficulty in use as previously stated since in many instances one feels the safety device is unwarranted but statistics have proven quite the contrary.

For these and other safety factors of an obvious nature I feel my twist lock—twist release spring cotter pin key puts the user at ease knowing there is a quick effective user friendly device unmatched in all other locking spring pin applications for its new method of usefulness apparant in its operation.

Reversal of the preceeding figures would exemplify the twist release function of the spring cotter pin.

Figure 5:
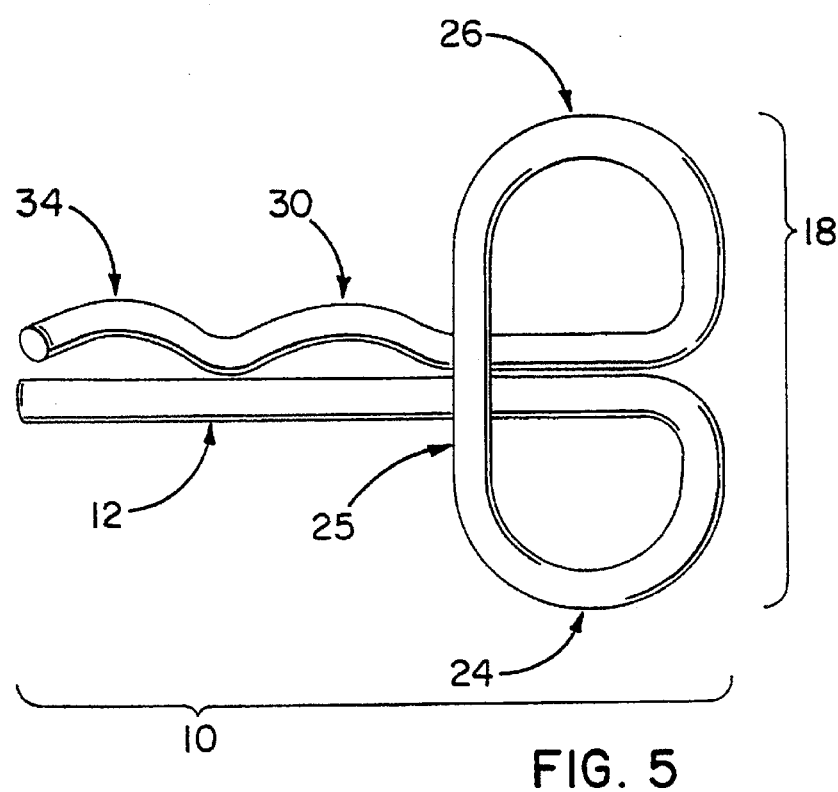
Figure 6:
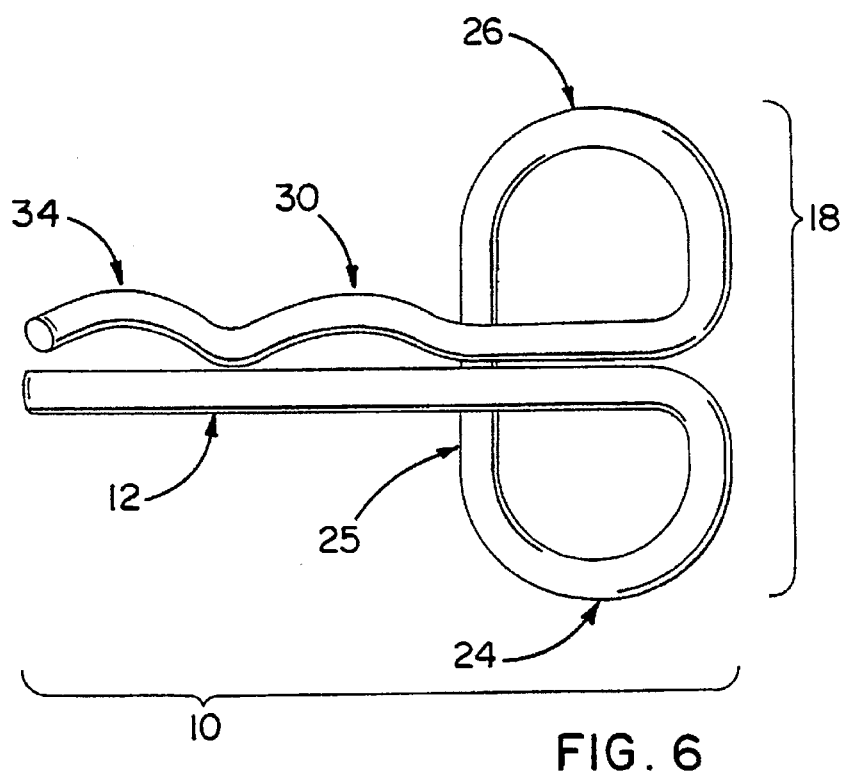

FIGS. 5 and 6 are a side view of a derivative of spring cotter pin 10 revealing an alternate graspable handle combination.

DETAILED DESCRIPTION OF THE PREFERRED EMBODIMENT

Figure 1:
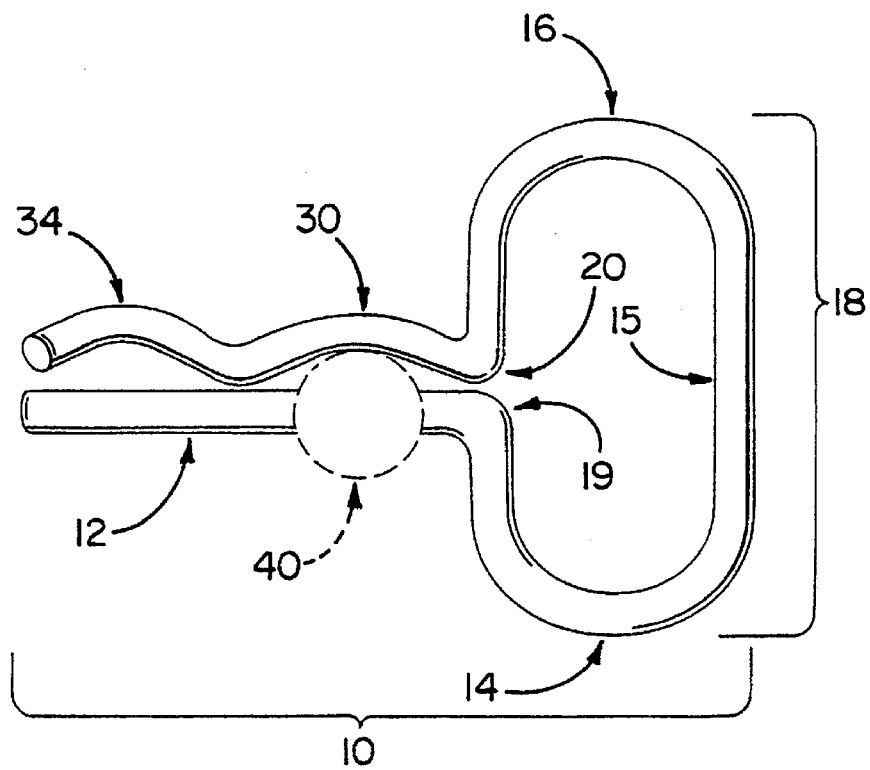
FIG. 1 is a side view of the twist lock—twist release spring cotter pin.

With reference to a more detailed representation of the drawings, FIG. 1 shows the twist lock—twist release spring cotter pin 10 inserted into an aperture of a structural element 40 shown in phantom. Said drilled or bored structural element may be commonly used to secure one or more elements together at a common location necessitating a securing device or spring cotter pin 10 to help maintain their common union against release from the structural element.

In a universal or standardized embodiment, one side of the spring cotter pin 10 is formed into a graspable handle 18 consisting of two identical directly facing U-shaped curves 14 and 16 joined directly by a straight run on one side 15 all lying on the same plane. Of the two remaining directly facing independent ends opposite side 15 of the U-shaped curves one said end bears a 90° bend 19 with an adjoining primary straight run 12 extending perpendicularly away from and on the same plane as side 15.

The opposite independent end lying opposite side 15 of the two directly facing curves 14 and 16 bears a 90° bend 20 extending perpendicularly away from and on the same plane as side 15 and adjacent to bend 19 extending to form two helical sections 30 and 34. The first one, 30, which is adjacently parallel to and on the same plane as its primary straight run counterpart 12 and perpendicular to side 15. The second helical section 34 extends adjacently parallel and laterally outward in relation to straight run counterpart 12.

Figure 2:
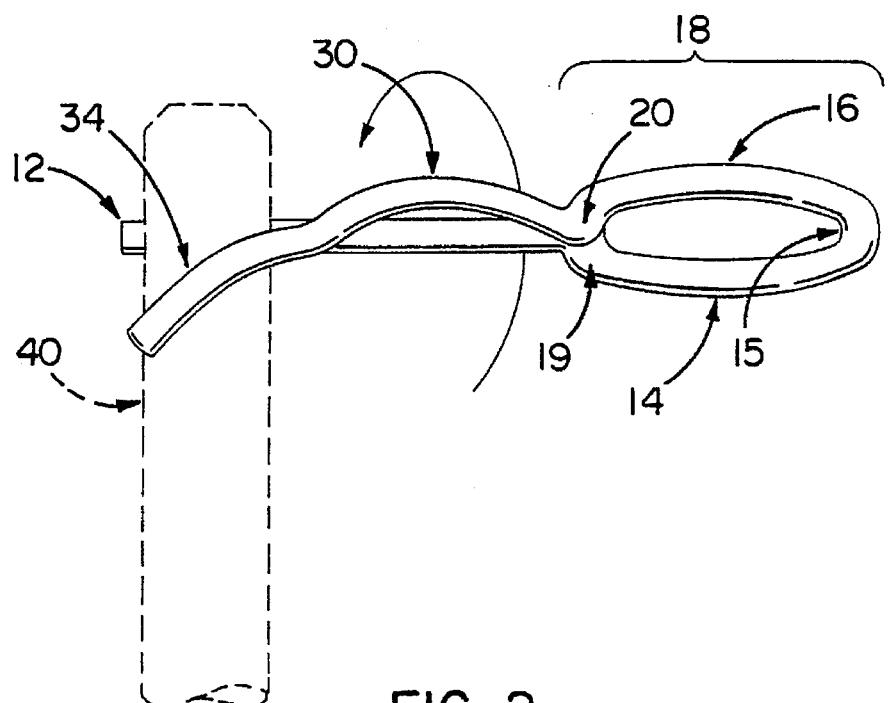
FIG. 2 is a top angled view of the spring cotter pin inserting an aperture in a structural element represented in phantom at the commencement of the twist lock function.

FIG. 2 shows a top view of the spring cotter pin 10 at the beginning of its twist lock application with 12 partially inserted through an aperture in structural element 40 shown in phantom to the point where helical section 34 is curved partially around surface of structural element 40. The spring cotter pin 10 is then turned or twisted counterclockwise in the direction of the arrow by use of graspable handle 18 causing helical section 34 to grasp structural element 40 and partially rotate about its surface causing 12 to slide through aperture in structural element 40, corresponding to the extent where helical section 30 is to begin its movement across surface of structural element 40.

Figure 3:
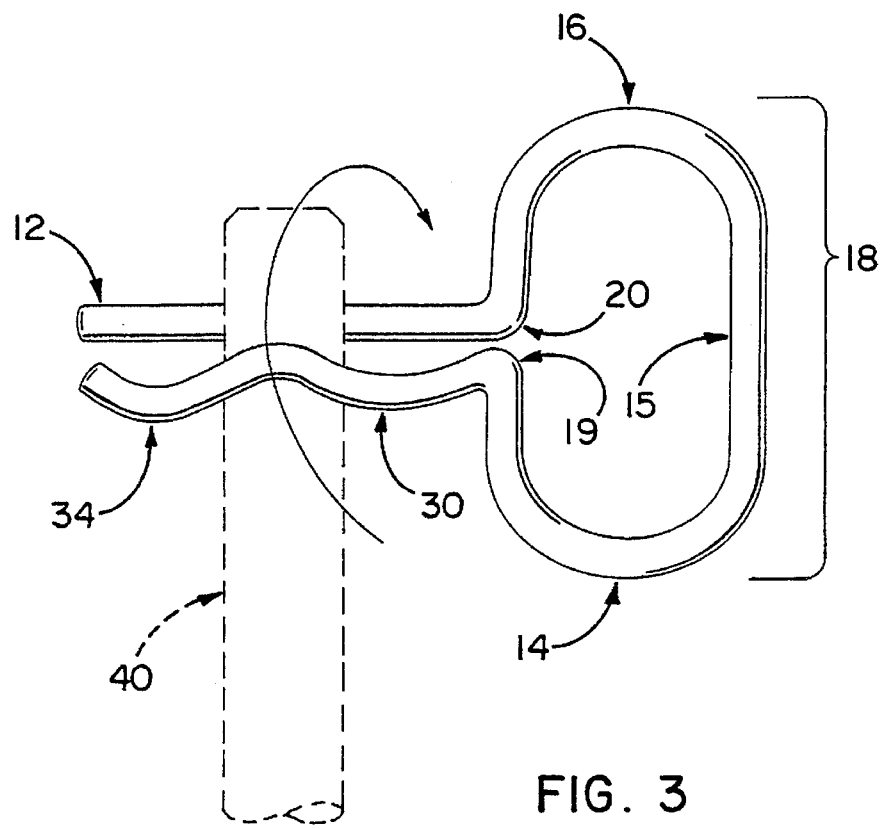
FIG. 3 is a die view of the spring cotter pin partially engaged in its twist lock insertion into an aperture of a structural element represented in phantom.
Figure 4:
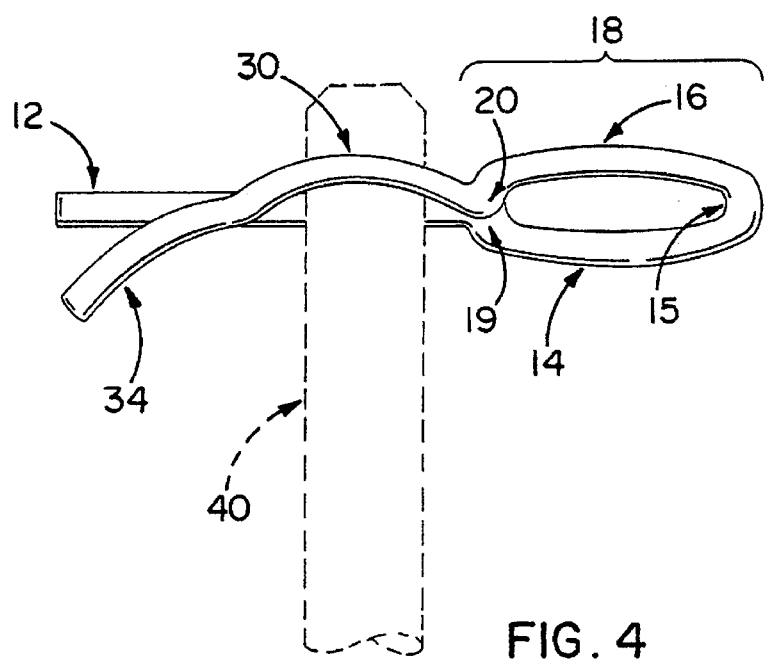
FIG. 4 is a top angled view of the spring cotter pin in its fully inserted twist locked position into an aperture of a structural element shown in phantom.

FIG. 3 is a continuation of the twist lock application of spring cotter pin 10 as begun in FIG. 2 except that it is positioned to commence its twist in a clockwise direction by means of the graspable handle 18 as shown by arrow in FIG. 3 reversing the twist of spring cotter pin 10 so that helical section 30 is grasping and slides across surface of structural element 40 shown in phantom preferably assisted by a minimal push or thrust by user, the combined effort of which, causes further insertion of 12 through aperture of structural element 40 to its final destination of insertion as shown in the top view of FIG. 4.

FIG. 4 represents a top view of the finalization of the twist lock proceedure for a simple, effortless and safe application of a spring cotter pin insertion into an aperture of a structural element with helical section 30 locked about the surface of structural element 40.

A reversal of the above proceedure beginning with FIG. 4 and ending with FIG. 2 would reveal the twist release concept for spring cotter pins.

Excepting but not necessarily limited to, a distinction must be mentioned. An additional function enhancing the application of the spring cotter pin lies in an inward compressing V-shaped configuration as formed by the two adjacent spring cotter pin legs as the helical curves from one leg rotate clockwise and counter clockwise about the axis of the straight leg augmenting a combined effort between rotating helical curves and the compressive V-shaped effort of the spring cotter pin extrimities across the surface and through the aperture of the structural element thus supporting its basic ease of operation, thereby not always necessitating much additional push or pull to persuade its movement.

FIGS. 5 and 6 represent a side view of spring cotter pin 10 showing a variance of the graspable handle 18 whereby the directing facing U-shaped curves 14 and 16 joined by a straight run 15 are exchanged for two directly boardering loops 24 and 26, with two corresponding curved portions from each connected by a straight run 25, and the corresponding free end from each looped portion of which one continues into the primary straight run 12 and the opposite free end continues into a series of alternating helical curves 30 and 34 lying contiguous to primary straight run 12.

It must be noted that one may be tempted to feel an inherent tendency to misuse the embodiments of the present invention for an attempted transfer of its teachings to the benefit of the claims in other patented inventions. Although efforts may be made to compare the method or knowledge of this invention to previous inventions of this type, its obvious distinctive properties, as claimed, overrule any attempts involving alteration, modifications or variations that attempt to fall within the spirit and broad scope of its documented findings.

I claim:

1. A spring cotter pin comprising a body formed of a single length of spring steel stock, bent to provide a substantially U-shaped pin with a handle portion at one end and two legs extending from the handle portion, one of said legs being straight and constituting a lock pin, adapted to be inserted through an aperture formed in a structural element, and the other said leg having plural outwardly bowed sections which assist in retaining the lock pin in the aperture.

2. The spring cotter pin of claim 1, whereby rotation of the spring cotter pin in either direction about the axis of the straight leg tends to position the legs of the spring cotter pin to form a compressive V-type shape, thereby enhancing the tendency of the spring cotter pin extrimities to move selectively across the surface and through the aperture of the structural element towards there lock and unlock positions.

3. The spring cotter pin of claim 1, wherein said other leg has two outwardly bowed sections.

4. The spring cotter pin of claim 3, wherein one of said outwardly bowed sections of said other leg is bent in the form of a helix, whereby rotation of the cotter pin in one direction, about the axis of the straight leg, tends to pull the straight leg into the structural element aperture and rotation in the opposite direction tends to push the straight leg back out of the aperture.

5. The spring cotter pin of claim 3, wherein both of said outwardly bowed sections of said other leg are bent in the form of a helix, with each helix extending in opposite directions, whereby rotation of the cotter pin in one direction tends to pull the pin inwardly across the first bowed section and rotation in the opposite direction tends to pull the pin inwardly across the second bowed section.

6. The spring cotter pin of claim 3, whereby the outer bowed section of the other leg is bent in the form of a helix, whereby rotation of the cotter pin in one direction about the axis of the straight leg, tends to pull the straight leg into the structural element aperture, and rotation in the opposite direction with an inclination to push or thrust the pin inwardly towards straight leg insertion, tends to draw the pin inwardly across the inner bowed section and the straight leg further into the aperture.

7. The spring cotter pin of claim 3, whereby the outer bow of the other leg is bent in the form of a helix, whereby rotation of the cotter pin in one direction about the axis of the straight leg tends to push the pin outwardly across the inner bow and rotation in the opposite direction tends to push the pin outwardly across the outer helix.

8. A spring cotter pin comprising a body formed of a single length of spring steel stock, bent to provide a substantially U-shaped pin with a handle at one end and two legs extending from the handle, one of said legs being straight and constituting a lock pin, adapted to be inserted through an aperture formed in a structural element, and the other said leg having an outwardly bowed section bent in the form of a helix, whereby rotation of the cotter pin in one direction tends to pull the straight leg into the structural element aperture, and rotation in the opposite direction tends to push it back out of the aperture.

* * * * *